United States Patent
Johnson et al.

(10) Patent No.: US 12,403,724 B2
(45) Date of Patent: Sep. 2, 2025

(54) TIRE FOR HIGH-POWER AGRICULTURAL VEHICLE

(71) Applicant: COMPAGNIE GENERALE DES ETABLISSEMENTS MICHELIN, Clermont-Ferrand (FR)

(72) Inventors: Philippe Johnson, Clermont-Ferrand (FR); Nizar Didane, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/024,652

(22) PCT Filed: Sep. 2, 2021

(86) PCT No.: PCT/FR2021/051507
§ 371 (c)(1),
(2) Date: Mar. 3, 2023

(87) PCT Pub. No.: WO2022/049345
PCT Pub. Date: Mar. 10, 2022

(65) Prior Publication Data
US 2023/0241920 A1    Aug. 3, 2023

(30) Foreign Application Priority Data
Sep. 4, 2020 (FR) .......................... 2008990

(51) Int. Cl.
*B60C 9/00* (2006.01)
*B60C 9/20* (2006.01)

(52) U.S. Cl.
CPC ............ *B60C 9/005* (2013.01); *B60C 9/2009* (2013.01); *B60C 2009/0085* (2013.01);
(Continued)

(58) Field of Classification Search
CPC ............... B60C 2200/08; B60C 9/005; B60C 9/2009; B60C 9/0085; B60C 9/2016; B60C 9/2019; D02G 3/48
See application file for complete search history.

(56) References Cited

U.S. PATENT DOCUMENTS

| 5,411,067 A | 5/1995 | Beeghly |
| 5,863,362 A * | 1/1999 | Creech .................. B60C 9/2009 |
| | | 152/526 |

(Continued)

FOREIGN PATENT DOCUMENTS

| EP | 2934917 | 10/2015 |
| FR | 3090493 | 6/2020 |

(Continued)

OTHER PUBLICATIONS

Tuschner (AG Tire Talk—Jul. 2, 2019 accessed at https://agtiretalk.com/best-load-speed-index/) (Year: 2019).*

*Primary Examiner* — Cedrick S Williams
(74) *Attorney, Agent, or Firm* — COZEN O'CONNOR

(57) ABSTRACT

A radial tire (1) for an agricultural vehicle, which has a speed index at least equal to D for a maximum speed equal to 65 km/h, the authorized inflation pressure of which during use on loose ground is less than or equal to 1 bar and the load index of which is at least equal to 158, the tread pattern of which comprises lugs with a radial height at least equal to 45 mm, having a crown reinforcement (3) with at most 4 crown layers (31, 32, 33, 34), each having reinforcing elements having a tensile breaking force at least equal to 32 daN and having an aramid strand and a nylon or PET textile fibre strand, the aramid strand having a tensile breaking force at least equal to 30 daN.

7 Claims, 1 Drawing Sheet

(52) U.S. Cl.
CPC ................ *B60C 2009/2016* (2013.01); *B60C 2009/2019* (2013.01); *B60C 2200/08* (2013.01)

(56) References Cited

U.S. PATENT DOCUMENTS

| | | | | |
|---|---|---|---|---|
| 2005/0133137 | A1* | 6/2005 | Westgate | D02G 3/48 |
| | | | | 152/556 |
| 2006/0174988 | A1* | 8/2006 | Ferlin | B60C 11/00 |
| | | | | 152/209.7 |
| 2014/0174614 | A1 | 6/2014 | Schreiner et al. | |
| 2014/0360648 | A1* | 12/2014 | Assaad | B60C 9/005 |
| | | | | 152/556 |
| 2016/0068025 | A1* | 3/2016 | Kodama | B60C 11/0316 |
| | | | | 152/209.12 |
| 2018/0162179 | A1* | 6/2018 | Bordoz | B60C 15/02 |
| 2020/0290404 | A1* | 9/2020 | Barrat | B29D 30/3021 |
| 2022/0307162 | A1* | 9/2022 | Lee | D02G 3/48 |

FOREIGN PATENT DOCUMENTS

| | | | | |
|---|---|---|---|---|
| WO | WO 2019/073143 | | 4/2019 | |
| WO | WO-2019197763 A1 * | 10/2019 | | B60C 1/00 |
| WO | WO 2020/128236 | | 6/2020 | |

\* cited by examiner

[Fig 1]
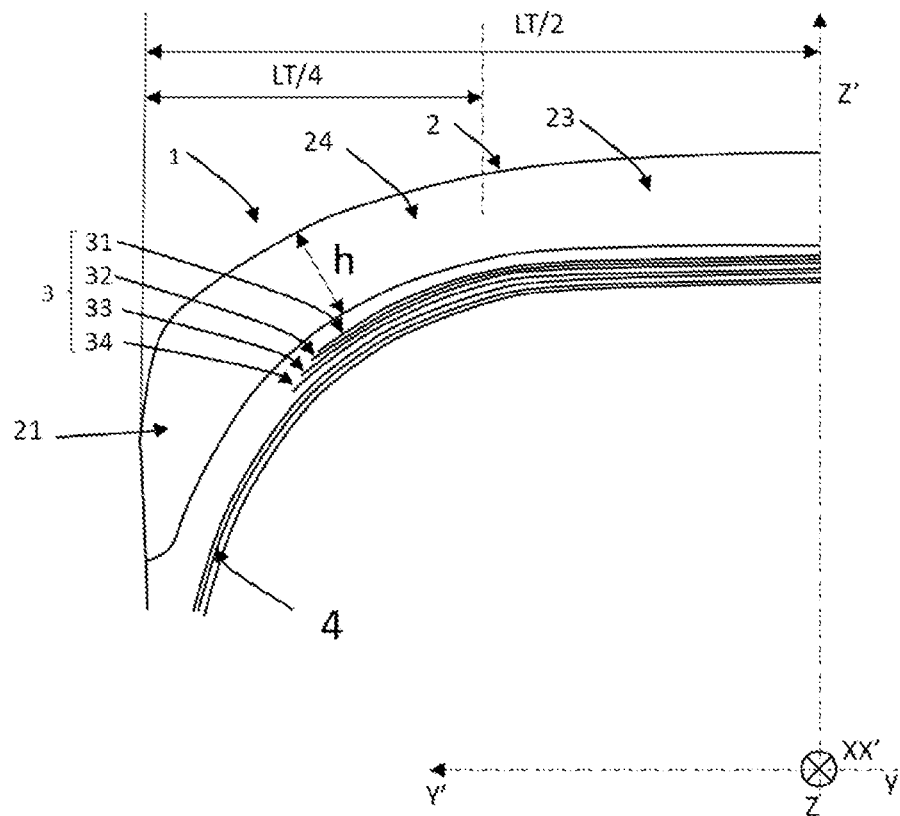
[Fig 2]
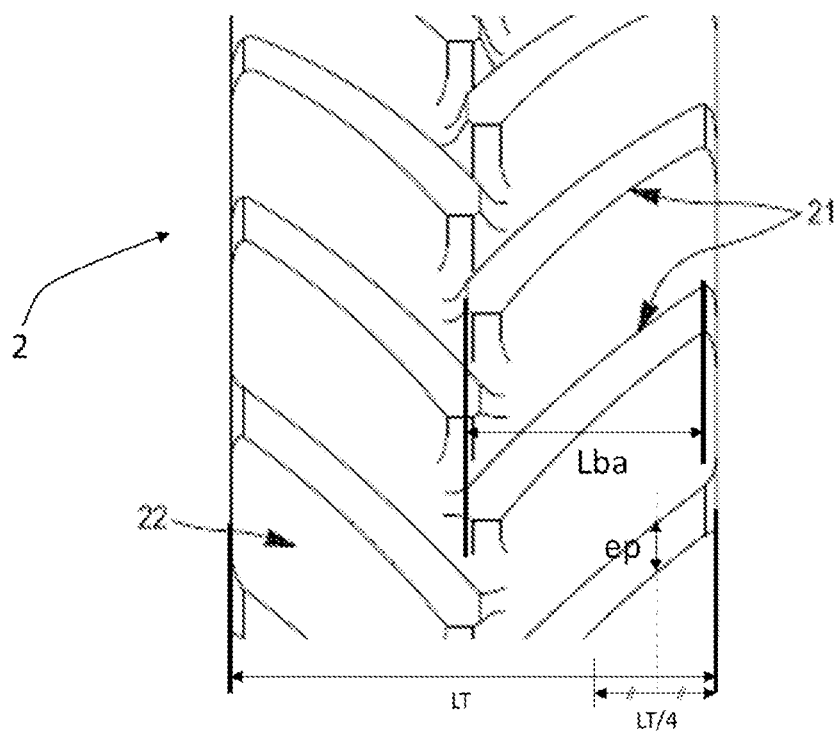

TIRE FOR HIGH-POWER AGRICULTURAL VEHICLE

RELATED APPLICATIONS

This is a U.S. National Phase Application under 35 USC 371 of International Application PCT/FR2021/051507 filed on Sep. 2, 2021.

This application claims the priority of French application no. FR 2008990 filed Sep. 4, 2020, the entire content of all of which is hereby incorporated by reference.

FIELD OF THE INVENTION

An object of the present invention is a radial tire for a high-power agricultural vehicle, referred to as a tractor, that is intended to tow tools requiring a high towing power in the fields by limiting the compaction of the soil, and more particularly relates to its crown reinforcement.

DEFINITIONS AND BACKGROUND OF THE INVENTION

The dimensional specifications and the use conditions (load, speed, pressure) of a tire for high-power tractors are defined by the use. The tires have average to large sizes depending on the crop type. The diameter of the mounting rims of these tires is at least equal to 24 inches. For agricultural tires, the minimum recommended inflation pressure corresponding to the indicated load-bearing capacity is usually at most equal to 300 kPa, but may drop as low as 240 kPa for an IF ("Improved Flexion") tire, or even 160 kPa for a VF ("Very high Flexion") tire. The invention has an interest in IF or VF tires with a minimum recommended inflation pressure corresponding to the indicated load-bearing capacity at most equal to 100 kPa or 1 bar. The maximum speed of these tires is 65 km/h, which corresponds to the speed index D. The load index of these tires is at least equal to 158 (4250 kg). Tires for high-power tractors have the feature of being able to tolerate high speeds on an asphalted road, and withstand significant traction forces on loose ground, since the vehicle is intended to tow tools such as a plough.

A tire for an agricultural vehicle comprises a tread intended to come into contact with the ground via a tread surface, the two axial ends of which are connected via two sidewalls to two beads that provide the mechanical connection between the tire and the rim on which it is intended to be mounted (U.S. Pat. No. 5,411,067).

In the following text, the circumferential, axial and radial directions refer to a direction tangential to the tread surface and oriented in the direction of rotation of the tire, to a direction parallel to the axis of rotation of the tire, and to a direction perpendicular to the axis of rotation of the tire, respectively.

A radial tire for an agricultural vehicle comprises a reinforcement consisting of a crown reinforcement radially on the inside of the tread and of a carcass reinforcement radially on the inside of the crown reinforcement.

The tread of a tire for an agricultural vehicle generally comprises a plurality of raised elements, known as tread pattern elements or blocks, which extend radially outward from a bearing surface, or bottom of the tread pattern, as far as the tread surface and are usually separated from one another by voids or grooves. These tread block elements are usually lugs, generally of overall parallelepipedal elongate shape, comprising at least one rectilinear or curvilinear portion. The size of the lugs, specifically their radial height and their circumferential thickness, is essential to ensure a traction force sufficient for use on loose ground.

The carcass reinforcement of a radial tire for an agricultural vehicle comprises at least one carcass layer connecting the two beads to one another. A carcass layer comprises reinforcers, or reinforcing elements, that are coated in a polymer material comprising an elastomer, obtained by blending, or elastomer compound. The carcass layer reinforcers usually consist of textile polymer materials, such as a polyester, for example. The reinforcers of a carcass layer are substantially mutually parallel and form an angle of between 85° and 95° with the circumferential direction.

The crown reinforcement of a radial tire for an agricultural vehicle comprises a superposition of circumferentially extending crown layers, radially on the outside of the carcass reinforcement. Each crown layer is made up of reinforcers which are coated in an elastomer compound and mutually parallel. When the reinforcers of a crown layer form an angle at most equal to 10° with the circumferential direction, they are referred to as circumferential, or substantially circumferential, and perform a hooping function that limits the radial deformations of the tire. When the reinforcers of a crown layer form an angle at least equal to 10° and usually at most equal to 40° with the circumferential direction, they are referred to as angled reinforcers, and have a function of reacting the transverse loads, parallel to the axial direction, that are applied to the tire. The crown layer reinforcers may consist of textile polymer materials, such as a polyester, for example, or of metal materials, such as steel.

A tire for an agricultural vehicle is intended to run over various types of ground such as the more or less compact soil of the fields, unmade tracks providing access to the fields, and the tarmacked surfaces of roads. Bearing in mind the diversity of use, in the fields and on the road, a tire for an agricultural vehicle needs to offer a performance compromise between traction in the fields on loose ground, resistance to chunking, resistance to wear on the road, resistance to forward travel, vibrational comfort on the road, resistance to fatigue caused by the number of revolutions, and the weight, this list not being exhaustive.

One essential problem in the use of a tire in the field is that of limiting, as far as possible, the extent to which the soil is compacted by the tire, as this is liable to hamper crop growth. This is why, in the field of agriculture, low-pressure and therefore high-flexion tires have been developed. The ETRTO ("European Tire and Rim Technical Organization") standard thus makes a distinction between IF ("Improved Flexion") tires, with a maximum recommended inflation pressure generally equal to 240 kPa, and VF ("Very high Flexion") tires, with a maximum recommended inflation pressure generally equal to 160 kPa. According to the standard, by comparison with a standard tire, an IF tire has a 20% higher load-bearing capacity and a VF tire has a 40% higher load-bearing capacity, for an inflation pressure equal to 160 kPa. The invention concerns IF or VF tires having an authorized inflation pressure, when the tire is being used on loose ground, of less than or equal to 1 bar.

One of the avenues of essential research in a world with limited resources is to reduce the weight of the products used to manufacture the tire.

However, the use of IF and VF tires for high-power tractors able to be used at high speed on roads, and on account of their possible use at low pressure with high flexion on loose soil, requires a high degree of endurance of the reinforcing elements, notably underneath the lugs of the tread pattern, and all the more so the greater the height of the lugs for the purpose of conferring traction. Thus, the crown reinforcement of tires for this use comprises six crown layers with textile reinforcers. Document EP 2934917 describes an IF tire test comprising a crown reinforcement comprising at least two crown layers with metal reinforcers, which is combined with a carcass reinforcement comprising at least two carcass layers with textile reinforcers.

However, the use of crown layers having metal reinforcers, in a tire for an agricultural vehicle, may lead to a reduction in the endurance of the crown of the tire, as a result of premature breakage of the metal reinforcers.

SUMMARY OF THE INVENTION

The inventors have set themselves the objective of maintaining the endurance of a crown reinforcement of an IF or VF agricultural tire, to a level at least equivalent to that of a crown reinforcement with 6 working layers of textile reinforcing elements whilst still decreasing the weight of the tire.

This aim has been achieved by a radial tire for an agricultural-type vehicle, which tire is IF or VF according to the 2020 ETRTO standard, which has an authorized inflation pressure during use on loose ground of less than or equal to 1 bar, which has a speed index at least equal to D for a maximum speed at least equal to 65 km/h, and which has a load index at least equal to 158, which tire is intended to be mounted on a rim with a diameter at least equal to 24 inches, comprising:
- a tread intended to come into contact with the ground via a tread surface, which tread has an axial width LT and comprises a central portion with an axial width LT/2 and two axially outer portions, each with an axial width LT/4,
- the two axially outer portions comprising tread pattern blocks with a radial height h at least equal to 45 mm, these blocks covering at least 80% of the axial width LT/4 of the axially outer portions of the tread and having a circumferential thickness ep at least equal to 65 mm,
- a crown reinforcement radially on the inside of the tread, comprising at most 4 working layers, each working layer comprising mutually parallel textile reinforcing elements which are coated in a rubber material and form angles at least equal to 15° and at most equal to 45° with the circumferential direction,
- the said textile reinforcing elements comprising at least one strand consisting of an assembly of at least two textile fibres,
- the textile reinforcing elements of the working layers having a tensile breaking force at least equal to 32 daN and comprising an aromatic polyamide (aramid) strand and a polyethylene terephthalate (PET) or aliphatic polyamide (nylon) strand, the aromatic polyamide strand having a tensile breaking force at least equal to 30 daN.

The solution works particularly well for agricultural tires having blocks or lugs, which are long tread pattern blocks having an axial width close to half the axial width of the tread. Designing a more compact structure with grooves and blocks with a small radial height, notably, would certainly make it possible to find a more lightweight solution by virtue of better exchange of heat between the crown layers and the outside of the tire and by decreasing the flexion of the crown in line with the lugs. Such a tread pattern would make it possible to decrease the mechanical and thermal stresses caused by the use of metal cords, for example, but would be adversely affected in terms of grip on loose ground.

The tread pattern blocks of the axially outer portions of the tread of the tires to which the invention relates have an axial width at least equal to 80% of the axial width of the axially outer portions of the tread, specifically LT/4, LT being the axial width of the tread. What this is understood to mean is that the axial distance from the axially outer end of the tread pattern block to its axially inner end is at least equal to 80% of one quarter the axial width of the tread. The axial width will be measured when the tire is new and to avoid the details of the sidewalls, and the points at which the measurements are taken will be part of the block and on its tread surface.

For effective operation on loose ground and notably when towing tools such as a plough, the tread pattern height or radial height of the lugs or tread pattern block is at least equal to 45 mm.

For sufficient resistance of the tread pattern elements to chunking and good transmission of the motor torque on loose ground, the circumferential thickness of the tread pattern blocks or of the lugs, measured halfway between the bottom of the tread pattern and the tread surface and in the circumferential plane passing through the centre of the axially outer portions of the tread, is at least equal to 65 mm. Furthermore, a preferred solution for limiting the thermal stresses whilst still maintaining resistance of the tread pattern elements to chunking for use by high-power tractors is that the circumferential thickness of the tread pattern is at most equal to 120 mm. This geometric feature of the tread pattern blocks or of the lugs is the most pertinent one as regards cracking under the thermal stresses of the compounds close to the axial ends of the crown layers. This circumferential distance is the distance over which the tread pattern block or the lug influences the operation of the crown layers, by deformation of the crown layers that said lug entails when running on a ground which does not deform much and by thermal insulation as regards the outside air that it generates as long as, for this use, the tread pattern height is particularly great.

In these conditions, in order for a crown reinforcement comprising at most 4 crown layers to have an endurance equivalent to the crown reinforcements with six crown layers that are sold on the market, it is essential that the reinforcing elements of the said crown layers have a breaking force at least equal to 32 daN, measured according to the standard denoted D885/D885M-10A (2014) and that they are composed of at least one aramid strand and at least one PET or nylon strand. This is because, to properly control the resistance to thermal stresses, it is essential that the reinforcing elements of the crown layers comprise at least one aramid strand, which is a reinforcer that is not a breakable element and therefore is not thermally sensitive to the thermal stress levels present in the crown of the tire. Furthermore, aramid has very good resistance to large deformations and, to resist the tensile forces, the aramid strand should have a breaking force at least equal to 30 daN. However, it is essential that the aramid strand is combined with at least one PET or nylon strand, the behaviour under compression of which will protect the aramid, which is more sensitive to compressive breaking.

A preferred solution is that the reinforcing elements of the working layers consist of an aramid strand and a PET or nylon strand, in order to limit the thickness of the layers.

It is advantageous that the reinforcing elements of the working layers consist of an aramid strand and a PET strand, the PET having a lower water-absorbing capacity than the nylon, which is important for agricultural vehicle tires, since water adversely affects the properties of the rubber materials coating the reinforcing elements.

For good resistance to the tensile forces at high deformation, it is preferred that the aramid strand of the reinforcing elements of the working layers has a linear density at least equal to 160 g per km.

For good resistance to the compressive forces, it is preferred that the PET strand of the reinforcing elements of the working layers has a linear density at least equal to 140 g per km.

The preferred solution is a tire in which the reinforcing elements of the 4 working layers are hybrid cords consisting of an aramid strand with a linear density of between 160 and 180 g per km and a PET strand with a linear density of between 140 and 160 g per km, the reinforcing elements of the working layers being disposed in the working layers at a pitch of between 0.8 mm and 1 mm.

BRIEF DESCRIPTION OF THE DRAWINGS

The features of the invention are illustrated by the schematic FIGS. 1 and 2, which are not drawn to scale:

FIG. 1: shows a diagram of a meridian half-section through the tire according to the invention, FIG. 2: shows a segment of the tread pattern of the tire according to the invention.

DETAILED DESCRIPTION OF THE DRAWINGS

FIG. 1 shows a segment of the crown of the tire according to the invention in a meridian plane YZ passing through the axis of rotation YY of the tire. The tire 1 for an agricultural vehicle for a high-power tractor comprises a crown reinforcement 3 radially on the inside of a tread 2 and radially on the outside of a carcass reinforcement 4. The crown reinforcement 3 comprises four crown layers (31, 32, 33, 34), each comprising mutually parallel hybrid textile reinforcing elements which comprise at least one aramid strand, are coated in an elastomeric material and form an angle A (not shown) at least equal to 15° and at most equal to 45° with a circumferential direction (XX'). The carcass reinforcement 4 comprises one or more carcass layers comprising mutually parallel textile reinforcing elements that are coated in an elastomeric material and form an angle at least equal to 85° and at most equal to 95° with the circumferential direction (XX'). The tread 2 comprises tread pattern blocks 21, in this instance continuous blocks usually referred to as lugs with a radial height h at least equal to 45 mm. The tread has an axial width LT and comprises a central portion 23 having an axial width LT/2 and two axially outer portions 24, each having an axial width LT/4. The lugs or tread pattern blocks have an axial width Lba greater than 0.8*LT/4.

FIG. 2 shows a segment of the tread 2 of a tire for an agricultural vehicle. The tread 2 has an axial width LT and comprises tread pattern blocks 21, in the present case lugs, and voids 22 that enable good grip on loose ground. The tread pattern blocks 21 on the axially outer portions of the tire have an axial width Lba greater than 80% of LT/4. When the tire is running, since the thickness of the lugs increases the thermal stresses, this type of tread generates cycles of compressive/tensile loading in the reinforcers of the crown layers, which are resisted better by the hybrid reinforcers comprising aramid according to the invention and a PET or nylon strand. To resist chunking, the lugs have a circumferential thickness ep, measured halfway up the tread pattern in the circumferential plane passing through the centre of each axially outer portion of the tread, at least equal to 65 mm.

The invention has been implemented more particularly for an agricultural tire of size IF710/70 R42. The tire according to the prior art comprises 6 crown layers, the reinforcing elements of which consist of three rayon strands with a linear density of 244 g per km, the reinforcing elements being disposed at a pitch of 0.95 mm. The tread pattern is composed of lugs with a radial height of 65 mm, a circumferential thickness ep measured in the middle of each axially outer portion of 84 mm, and an axial width representing 51% of the total width of the tread.

The tire according to the invention is identical to the control except that it comprises 4 crown layers, the reinforcing elements of which are hybrid cords consisting of an aramid strand with a linear density equal to 167 g per km and a PET strand with a linear density equal to 144 g per km, the reinforcing elements of the working layers being disposed in the working layers at a pitch equal to 0.85 mm. The aramid strand has a breaking force equal to 35 daN, and the reinforcing element has a breaking force equal to 37 daN.

The tire according to the invention makes it possible to decrease the weight of the crown layers by 17 kg, that is to say 50%, and has been tested in terms of endurance. The inventors tested the invention by comparing the service life, as regards the endurance of the crown reinforcement, of the two tires for high-power tractors. The tires were run on a dirt track at 27 km/h over a distance of 28 000 km, under a nominal load increased by 25%, i.e. 9688 kg, and at the nominal pressure of 2.4 bar. The tire according to the invention, with a lower weight, travelled an equivalent number of kilometres as the tire according to the prior art, without exhibiting any damage to the crown layers, demonstrating the advantage of the invention in realizing a more lightweight tire with equivalent endurance.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A radial tire for an agricultural-type vehicle, which tire is IF or VF according to the 2020 ETRTO standard, which has an authorized inflation pressure during use on loose ground of less than or equal to 1 bar, which has a speed index at least equal to D for a maximum speed at least equal to 65 km/h, and which has a load index at least equal to 158, configured for mounting on a rim with a diameter at least equal to 24 inches, comprising:

a tread intended to come into contact with the ground via a tread surface, which tread has an axial width LT and comprises a central portion with an axial width LT/2 and two axially outer portions, each with an axial width LT/4, the two axially outer portions comprising tread pattern blocks with a radial height h at least equal to 45 mm, these blocks covering at least 80% of the axial width LT/4 of the axially outer portions of the tread and having a circumferential thickness ep at least equal to 65 mm, a crown reinforcement radially inside of the tread, comprising at most four working layers, each working layer comprising—textile reinforcing—cords, which are coated in a rubber material and which are mutually parallel to form angles at least equal to 15° and at most equal to 45° with a circumferential direction of the tire, wherein each textile reinforcing cord of each working layer is a hybrid cord that:

has a tensile breaking force at least equal to 32 daN, and comprises:

a first strand, which consists of an aromatic polyamide (aramid), which has a linear density at least equal to 160 g per km and which has a tensile breaking force at least equal to 30 daN, and a second strand, which consists of polyethylene terephthalate (PET) and which has a linear density of between 140 and 160 g per km.

2. The tire according to claim 1, wherein the tread pattern blocks have a leading edge and a trailing edge, and the tread pattern blocks overlap circumferentially at their respective axially inner ends such that a respective leading edge completely circumferentially overlaps with a respective trailing edge of another adjacent tread pattern block on a same side of the axial width with respect to a midline.

3. The tire according to claim 1, wherein the linear density of the first strand is between 160 g per km and 180 g per km.

4. The tire according to claim 3,
wherein in each working layer, the hybrid cords are disposed at a pitch of between 0.8 mm and 1 mm.

5. The tire according to claim 1, wherein each textile reinforcing cord of each working layer is a hybrid two-strand cord consisting of the first strand and the second strand.

6. The tire according to claim 5, wherein the linear density of the first strand of each hybrid two-strand cord is between 160 g per km and 180 g per km.

7. The tire according to claim 6,
wherein in each working layer, the hybrid two-strand cords are disposed at a pitch of between 0.8 mm and 1 mm.

* * * * *